Patented Aug. 15, 1950

2,518,730

UNITED STATES PATENT OFFICE 2,518,730

PROCESS OF PREPARING TRINUCLEAR CYANINE DYES CONTAINING A TERMINAL 5-MEMBERED NITROGENOUS HETEROCYCLIC RING SYSTEM

Thomas R. Thompson, Binghamton, N. Y., assignor to General Aniline & Film Corporation, New York, N. Y., a corporation of Delaware No Drawing. Application December 21, 1948, Serial No. 66,574

8 Claims. (Cl. 260—240.1)

This invention relates to trinuclear cyanine dyes and to a method of preparing the same.

Trinuclear cyanine dyes have been prepared by the method described in United States Patent 2,388,963. The method consists of first quaternizing a cyclammonium base containing a reactive thio group, and condensing it with a 3-ethylrhodanine to obtain the merocyanine intermediate. This procedure involves two steps and requires about 4 hours' time. The merocyanine intermediate is then fused with a mixture of a cyclammonium base and a quaternizing agent, such as methyl p-toluenesulfonate for 2½ to 3½ hours. After cooling the melt, pyridine is added and the mixture reheated under reflux for 20 to 30 minutes. The reaction mixture is then poured into an aqueous solution of potassium bromide and the final dye obtained by recrystallization from alcohol. The minimum time required for the latter two steps is approximately from 3 to 4 hours, exclusive of the time required to cool the reaction mixture.

Theoretically, the trinuclear dyes should be capable of production by treating a 3-alkylrhodanine with an alkyl salt to effect quaternization of the hetero nitrogen atom thereof, and conversion of the thioketo group to a thioether group, the reaction of the thioether group with the reactive grouping of a cyclammonium salt and the linking of the intermediate so formed to a cyanine dye intermediate through the reactive methylene group of the thiazolone ring. In other words, it would seem that said dyes would form by carrying out, with the 3-alkylrhodanine per se, the last step of the conventional process and using the thus formed intermediate for reaction with another mol of a cyanine dye intermediate. Very surprisingly, however, it has been ascertained that the 2-alkylthio-3-alkylrhodanines do not react with a cyclammonium salt to yield thiazolone cyanine dye intermediates.

Because of this, the art has become firmly convinced that in order to prepare trinuclear cyanine dyes of the rhodacarbocyanine type, it is necessary to treat a preformed merocyanine dye with an alkyl salt to simultaneously effect quaternization of the nitrogen atom of the rhodanine ring system and the conversion of the thioketo group to a thioether group, and to react the resulting salt with a cyclammonium quaternary salt of the type used in the formation of cyanine dyes. The process steps involved in this preparation are not only tedious but time consuming.

It is an object of the present invention to provide a new class of trinuclear cyanine dyes.

A further object of the present invention is a method of producing the said dyes.

A still further object is to provide a simpler method whereby new trinuclear cyanine dyes in excellent yield are obtained.

Other objects and advantages will become apparent from the following description.

I have found that trinuclear cyanine dyes are obtained in excellent yield and in readily purifiable form by treating a 3-alkyl, 3-aryl, or 3-aralkyl substituted 5-membered ketomethylene heterocyclic compound containing a reactive methylene group adjacent to a keto group of the type commonly employed in merocyanine dyes with a thiazolone cyanine dye salt intermediate in the presence or absence of a suitable solvent, such as an aliphatic alcohol, e. g., methyl, ethyl, n-propyl, isopropyl, and the like, and in the presence of a basic condensing agent, such as trimethylamine, triethylamine, pyridine, methylpyridine, ethylpyridine, quinoline, potassium carbonate and the like, on a steam bath or by heating the reaction mixture at reflux for a period of from 5 to 20 minutes.

The dyes obtained by the foregoing procedure are characterized by the following general formula:

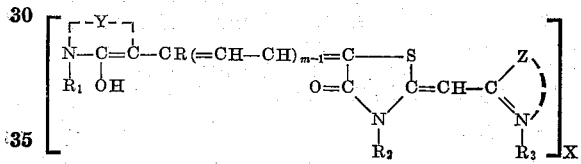

wherein R represents hydrogen or an alkyl group, e. g., methyl, ethyl, propyl or butyl, R being only alkyl when $m$ represents 1, $R_1$ and $R_2$ which may be alike or different represent an alkyl, allyl, aryl, or aralkyl group, e. g., methyl, ethyl, propyl, phenyl, naphthyl, tolyl, benzyl, phenethyl and the like, $R_3$ represents an aliphatic, aryl, aralkyl or substituted group of this type, e. g., methyl, ethyl, propyl, butyl, hydroxyethyl, ethoxyethyl, phenyl, tolyl, naphthyl, benzyl, phenethyl, menaphthyl and the like, $m$ represents a positive integer of from 1 to 3, X represents an acid radical, e. g., chloride, bromide, iodide, or alkyl sulfate, alkyl p-toluenesulfonate or perchlorate, Y represents the residue of a 5-membered heterocyclic nitrogenous ring system of the type used in merocyanine dyes, e. g., N-alkyl, N-allyl, N-aryl, N-aralkyl substituted derivatives of rhodanic acid, 5-pyrazolones, thiazolediones, thiazolones, oxazolediones, thiohydantoins, and the like, and Z represents the residue of a heterocyclic nitrogenous nucleus of the type used in cyanine dyes, e. g., oxazoles, thiazoles, selenazoles, and their polycyclic homologues, such as those of the benzene, naphthalene, acenaphthene, and anthracene series, pyridine, and its polycyclic homologues, such as quinoline and $\alpha$- and $\beta$-naphthaquinolines, perinaphthiazoles, indolenines, diazines, such as pyrimidines and quinazolines, diazoles (e. g., thio-$\beta$-$\beta'$-diazole), oxazolines, pyrrolines, thiazolines and selenazolines (the polycyclic compounds of these series being substituted if desired in the carbocyclic rings with one or more conventional groups, such as alkyl or aryl, as below, amino, hydroxy, alkoxy, i. e., methoxy, ethoxy, etc., and methylene-dioxy groups, or by halogen atoms, i. e., chlorine, bromine, etc.).

The N-substituted 5-membered ketomethylene heterocyclic compounds of the type commonly employed in merocyanine dye synthesis, which are treated with a thiazolone cyanine dye intermediate are characterized by the following general formula:

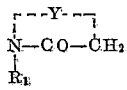

wherein Y and $R_1$ have the same values as above.

As typical examples of such compounds, the following may be mentioned.

3-ethylrhodanine
3-allylrhodanine
3-phenylrhodanine
3-benzylrhodanine
3-methyl-4-keto-2-seleno-tetrahydro-oxazole
3-phenyl-4-keto-2-seleno-tetrahydro-selenazole
3-propyl-4-keto-2-seleno-tetrahydro-thiazole
1-phenyl-3-methyl-5-pyrazolone
1-methyl-5-pyrazolone
1,3-dimethyl-5-pyrazolone
1,3-diphenyl-5-pyrazolone
3-phenyl-2,4-thiazoledione
2-diphenylamino-3-ethyl-4(5)-thiazolone
3-ethyl-2-thio-2,4(3,5)-oxazoledione
3-ethyl-1-phenyl-2-thiohydantoin, and the like.

The thiazolone cyanine dye intermediates, utilized as the coreactants with the foregoing N-substituted 5-membered ketomethylene heterocyclic compounds, are characterized by the following general formulae:

(a) 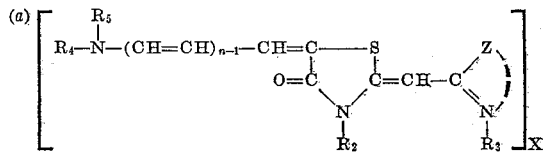

(b) 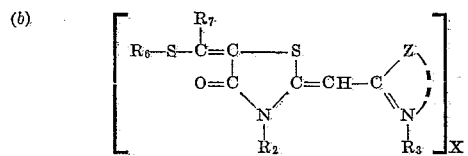

and (c) 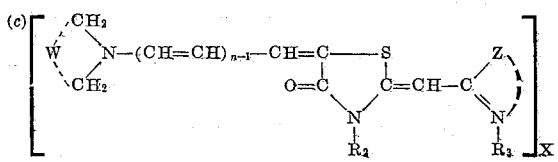

wherein $R_2$, $R_3$, X and Z have the same values as above, $R_4$ represents an aryl group of the benzene and naphthalene series such as phenyl, chlorophenyl, diphenyl or naphthyl, $R_5$ represents either hydrogen or an acetyl group, $R_6$ represents an alkyl or aralkyl group, e. g., methyl, ethyl, propyl, isopropyl, benzyl, $\beta$-phenethyl, and the like, $R_7$ represents an alkyl group, e. g., methyl, ethyl, propyl, isopropyl, butyl, isobutyl, etc., and $n$ represents a positive integer of from 1 to 3, and W represents the atoms necessary to complete a saturated nitrogenous heterocyclic nucleus, such as, for example, piperidine, $\beta$- and $\gamma$-pipecoline, pyrrolidine, morpholine, tetrahydroquinoline, and the like.

The dyestuff intermediates illustrated by the Formulae a and c are prepared according to the method described in my copending application Serial No. 66,571, filed on December 21, 1948, and the intermediates illustrated by the second Formula b are prepared according to the method described in my copending application Serial No. 66,572, filed on December 21, 1948.

The dyestuff intermediates illustrated by Formula a are, in general, obtained by treating a diarylformamidine or its vinylog such as $\beta$-anilinoacrolein anil hydrochloride or glutaconic aldehyde dianil hydrochloride, in the presence of an acid condensing agent such as acetic anhydride or in the presence of a basic condensing agent such as triethylamine or piperidine, with a thiazolone cyanine dye.

The dyestuff intermediates illustrated by Formula b are obtained by treating a thiazolone cyanine dye with an aliphatic acid anhydride in the presence of a mixture of pyridine and triethylamine followed by treatment with phosphorus pentasulfide to yield the thioketone derivative which is subsequently alkylated with an alkylating agent in the usual way to yield the thioether derivative.

The dyestuff intermediates containing a terminal saturated heterocyclic nitrogenous ring nucleus are prepared by treating a thiazolone cyanine dye with a diarylformamidine or its vinylog in the presence or absence of an aliphatic alcohol as a diluent and in the presence of a saturated heterocyclic nitrogenous compound such as morpholine, piperidine, tetrahydroquinoline, and the like.

The thiazolone cyanine dyes utilized in preparing the foregoing intermediates are characterized by the following general formula:

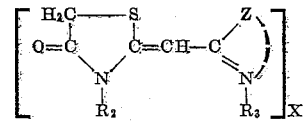

wherein $R_2$, $R_3$, X and Z have the same values as above, and are prepared according to the method described in my copending application Serial No. 786,814, filed November 18, 1947. In general, the method consists of condensing a substituted thioamide with an $\alpha$-halogen acetic acid. The compounds, in view of their ketomethylene configuration undergo keto-enol tautomerism, i. e., the keto group enolizes to form a hydroxyl group.

The following examples describe the preparation of some of the thiazolone cyanine dye intermediates illustrated by Formulae a and b which are utilized in the preparation of the trinuclear cyanine dyes.

Example I

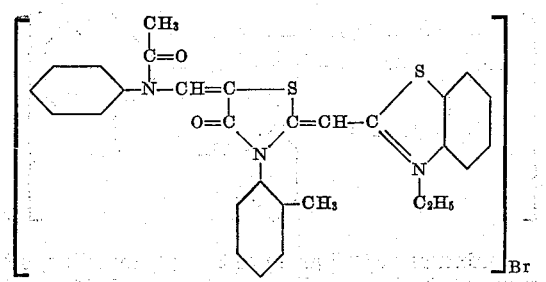

A mixture of 5 grams of diphenylformamidine, 5 grams of the thiazolone cyanine dye of the following structure:

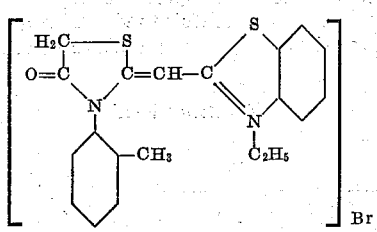

and 15 cc. of acetic anhydride was heated at 140° C. for 30 minutes. After cooling, the product was precipitated with ether and purified by dissolving in a small amount of methanol followed by precipitation with ether. A yield of 5.9 grams of yellow green crystals, having a melting point at 213–215° C., was obtained.

Example II

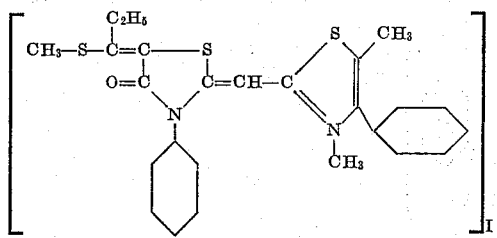

A mixture of 75 cc. of pyridine, 15 cc. of propionic anhydride, 15 cc. of triethylamine, and 15 grams of thiazolone cyanine dye of the following structure:

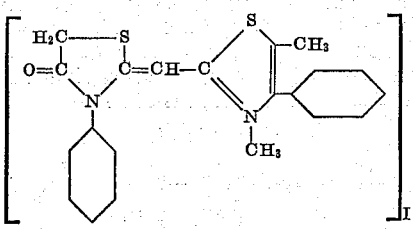

was heated at 120° C. for 30 minutes. Fifteen grams of phosphorus pentasulfide were added in portions and the reaction mixture stirred at 120° C. for 30 minutes. The product was isolated by pouring the reaction mixture into 30 cc. of water. The product was purified by washing with water and subsequently grinding with acetone. A yield of 10.9 grams of yellow glistening crystals melting at 255–260° C. was obtained. The product was fused with 10 cc. of methyl sulfate at 95° C. for 10 minutes to yield a thick solution which upon treatment with an acetone solution of sodium iodide deposits yellow crystals,

Example III

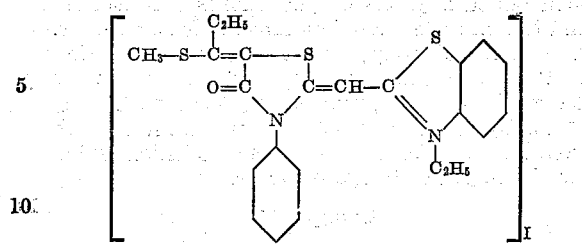

A mixture of 75 cc. of pyridine, 10 cc. of propionic anhydride, 10 cc. of triethylamine, and 13 grams of the thiazolone cyanine dye of the following structure:

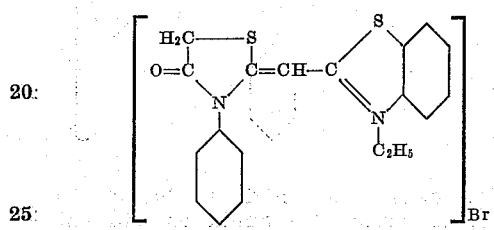

was heated with stirring at 120° C. for 20 minutes. During the course of 10 minutes, a total of 10 grams of phosphorus pentasulfide was added in portions at 120° C. After an additional 10 minutes heating and stirring at 120° C., the mixture was poured into cold water and stirred until the first formed oil solidified. The crude product was stirred with 300 cc. of a 1% aqueous solution of sodium hydroxide and purified by boiling out with isopropanol. There was obtained 10.2 grams of yellow powder which decomposes at about 200° C.

A mixture of 9.3 grams of the yellow powder and 10 grams of methyl p-toluenesulfonate was fused at 95° C. for 1 hour. After cooling, the product was washed with ether and dissolved in 10 cc. of warm acetone. The final product was precipitated as the iodide, by adding 25 cc. of methanol containing 20% sodium iodide. The product was washed with water and purified by boiling out with isopropanol. A yield of 4.3 grams of a product melting at 225–228° C. was obtained.

Example IV

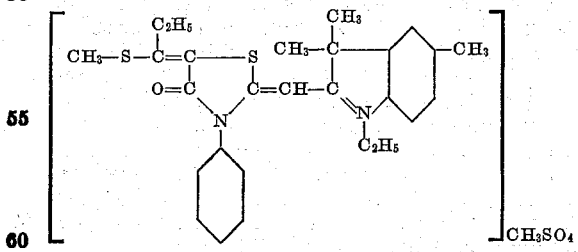

A mixture of 15 cc. of pyridine, 2 cc. of propionic anhydride, 2 cc. of triethylamine, and 2.0 grams of the thiazolone cyanine dye of the following structure:

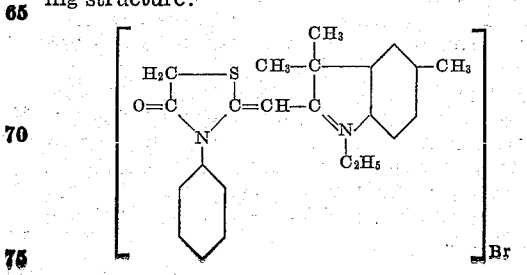

was heated at 120° C. for 3 minutes. There were then added 2 grams of phosphorus pentasulfide and the mixture heated at 115° C. for 15 minutes. A dark red oil was precipitated by the addition of 100 cc. of water and washed with water by decantation. The product was fused with 3 cc. of methyl sulfate at 95° C. for 10 minutes to yield 4.5 grams of a yellow-orange solution which may be employed in dye synthesis.

*Example V*

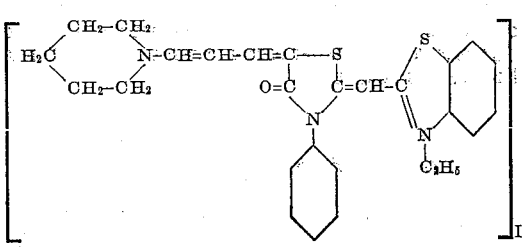

A mixture of 0.5 grams of the product of Example III, 0.3 gram of β-anilinoacrolein anil hydrochloride, 10 cc. of methanol, and 0.5 gram of piperidine was heated at reflux for 5 minutes. The reaction mixture was poured into 60 cc. of water containing 1 gram of potassium iodide. The crystals were separated and purified by boiling out with isopropyl alcohol. A yield of 0.4 gram of a product having a melting point of 270–271° C. was obtained. A methanol solution of the compound has an absorption maximum at 540 mμ.

*Example VI*

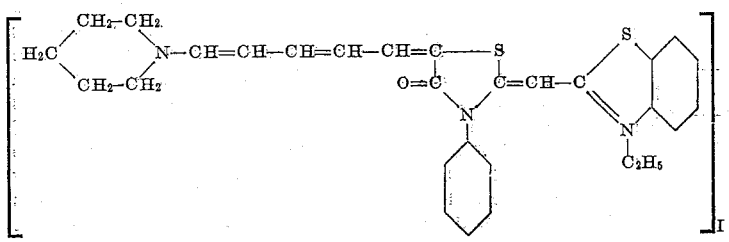

A mixture of 2.85 grams of glutaconaldehyde dianil hydrochloride, 4.3 grams of the compound of Example III, 1 cc. of piperidine and 50 cc. of methanol was heated at reflux for 30 minutes. The reaction mixture was poured into 300 cc. of water containing 5 grams of potassium iodide. The precipitated product was filtered and boiled out with isopropyl alcohol. A yield of 3.7 grams of a compound having a melting point of 195–198° C. was obtained. A methanol solution of the product has an absorption at 624 mμ.

The anions of the foregoing thiazolone cyanine dye salts may be replaced by other anions, such as iodide, thiocyanate or perchlorate ions by treating an alcohol solution of the halogen salt with an aqueous or aqueous-alcohol solution containing a sodium or potassium salt of the desired anion.

The following examples describe in detail the improved and simplified method of preparing trinuclear cyanine dyes from the foregoing thiazolone cyanine dye intermediates, but it is to be understood that they are given merely for the purpose of illustration and are not to be construed as limitative.

*Example VII*

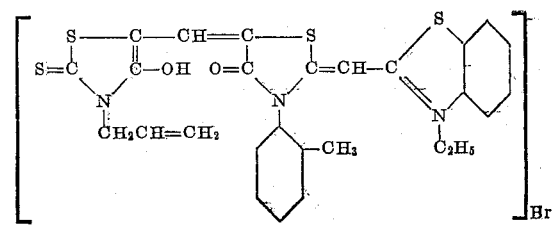

A mixture of 0.35 gram of 3-allylrhodanine, 0.8 gram of the intermediate of Example I, 50 cc. of methanol, and 0.5 cc. of triethylamine was heated at reflux for 5 minutes. The crude dye was boiled out with methanol and finally crystallized from pyridine. A yield of 1.25 grams of a product melting above 295° C. was obtained. The absorption maximum of this dye in a methanol solution is 610 mμ.

*Example VIII*

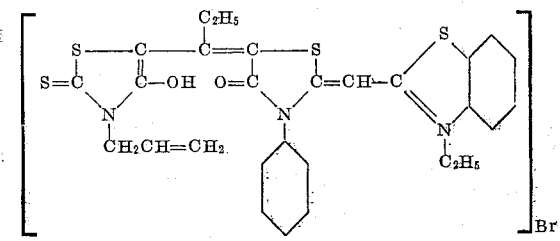

A mixture of 0.35 gram of 3-allylrhodanine, 1.03 grams of the intermediate of Example III, 50 cc. of methanol and 1 cc. of triethylamine was heated at reflux for 15 minutes. After cooling, the dye was separated and purified by boiling out with methanol. A yield of 0.5 gram of a product melting at 173–175° C. was obtained. The absorption maximum in methanol is 594 mμ. When the dye is incorporated into a photographic emulsion the sensitization maximum is 650 mμ.

*Example IX*

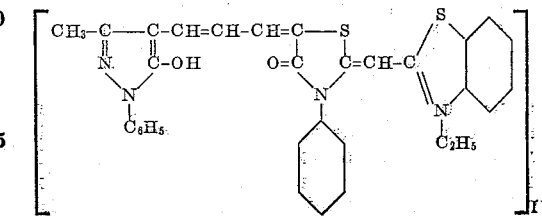

A mixture of 0.6 gram of the intermediate of Example V, 0.2 gram of 3-methyl-1-phenylpyrazolone, 20 cc. of methanol, and 1 cc. of triethylamine was heated at reflux for 10 minutes. The very slightly soluble dye was filtered off and purified by boiling out with methanol. A yield of 0.6 gram of the purified dye was obtained.

Example X

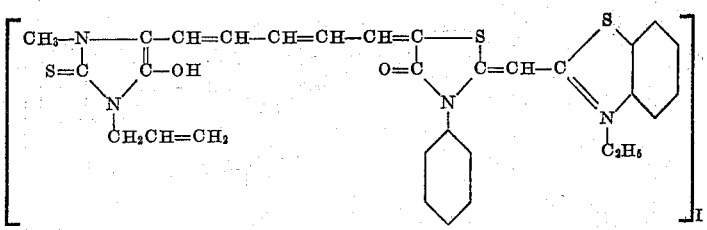

A mixture of 1.2 grams of the intermediate of Example VI, 0.5 gram of 3-allyl-1-methyl-2-thiohydantoin, 25 cc. of methanol and 1 cc. of triethylamine was heated at reflux for 5 minutes. After cooling the dye crystals were removed and purified by boiling out with methanol. A yield of 0.5 gram of a product melting at 199–203° C. was obtained. The absorption maximum in methanol is 621 m$\mu$. The sensitization of a photographic emulsion is extended to 720 m$\mu$ with a maximum at 680 m$\mu$.

Example XI

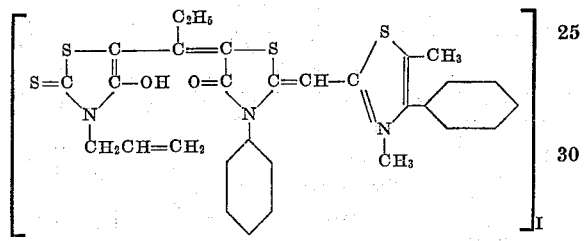

A mixture of 0.5 gram of the product of Example II, 0.2 gram of 3-allylrhodanine, 15 cc. of isopropyl alcohol, and 0.5 cc. of triethylamine was heated at reflux for 10 minutes. The dye separated on cooling and was purified by boiling out with isopropyl alcohol. A yield of 0.4 gram of the dye was obtained. The absorption maximum of a methanol solution is 583 m$\mu$. When incorporated in a photographic emulsion the sensitization is at 640 m$\mu$.

While the present invention has been described in considerable detail with reference to certain preferred procedures and materials employed, it is understood that the improved process of preparing trinuclear cyanine dyes is not limited thereto, and that numerous variations and modifications described in the foregoing specification may be made as, for example, the dyes which contain a thioketone group in the terminal 5-membered heterocyclic nitrogenous nucleus, as illustrated in Examples 7, 8, 10 and 11 inclusive, may be further treated with a quaternizing compound such as methyl iodide. The quaternized compound is then condensed under reflux conditions with a cyclammonium base or salt of the type used in cyanine dyes, such as 2-methylbenzothiazole ethiodide and the like, having a reactive methyl group in $\alpha$-position to the nitrogen atom thereof, in the presence of a basic condensing agent such as pyridine. In the first reaction (alkylation), the trinuclear dye is modified to the extent that the nitrogen atom in the 3-position of the oxazoledione, hydantoin or rhodanine ring is quaternized and the sulfur atom in the 2-position is converted to a thioether group. In the second reaction (condensation), the alkylated trinuclear cyanine dye is condensed with a cyclammonium base or salt whereby symmetrical tetranuclear and new unsymmetrical tetranuclear cyanine dyes are obtained. Accordingly, the scope of my invention is to be limited solely by the appended claims.

I claim:

1. Trinuclear cyanine dyestuffs of the class consisting of compounds having the following formulae:

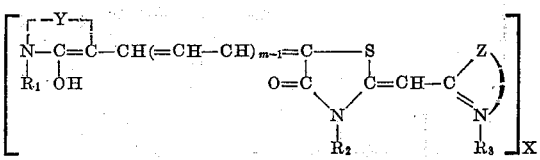

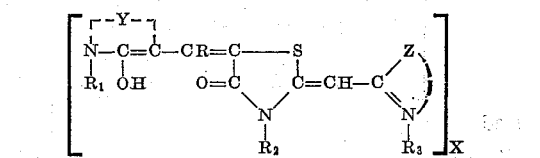

wherein $m$ represents a positive integer of from 1 to 3, R is selected from the class consisting of hydrogen and lower alkyl, $R_1$ and $R_2$ are selected from the class consisting of alkyl, allyl, aryl and aralkyl groups, $R_3$ is selected from the class consisting of lower alkyl, lower hydroxyalkyl, lower alkoxyalkyl, aryl of the benzene and naphthalene series, and aralkyl groups, X represents an acid radical, Y represents the residue of a 5-membered heterocyclic nitrogenous ring system, and Z represents the residue of a heterocyclic nucleus of the type used in cyanine dyes.

2. A trinuclear cyanine dyestuff having the formula:

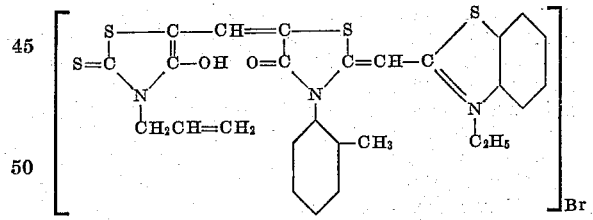

3. A trinuclear cyanine dyestuff having the formula:

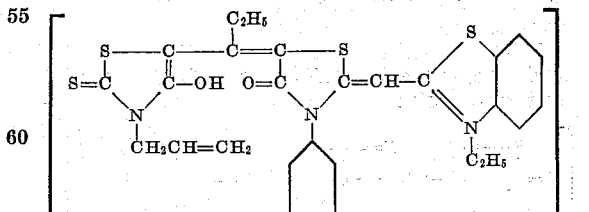

4. A trinuclear cyanine dyestuff having the formula:

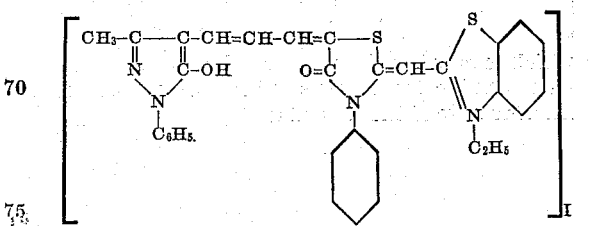

5. A process for the production of trinuclear cyanine dyestuffs which comprises treating in the presence of a basic condensing agent a 5-membered ketomethylene heterocyclic compound of the formula:

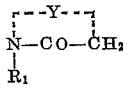

with a thiazolone cyanine dye intermediate characterized by a formula selected from the class consisting of the following formulae:

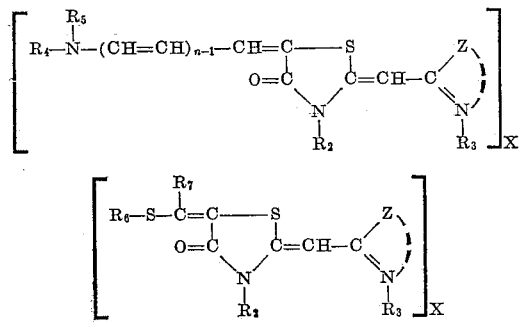

and

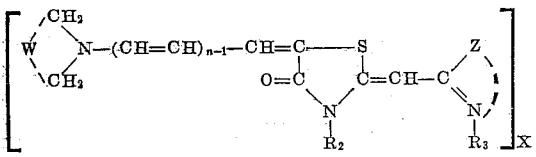

wherein $R_1$ and $R_2$ represent a member selected from the class consisting of alkyl, allyl, aryl, and aralkyl groups, $R_3$, represents a member selected from the class consisting of lower alkyl, lower hydroxyalkyl, lower alkoxyalkyl, aryl of the benzene and naphthalene series, and aralkyl groups, $R_4$ represents an aryl group, $R_5$ represents a member selected from the class consisting of hydrogen and acetyl group, $R_6$ represents a member selected from the class consisting of alkyl and aralkyl groups, $R_7$ represents an alkyl group, $n$ represents a positive integer of from 1 to 3, W represents the atoms necessary to complete a saturated heterocyclic nitrogenous ring system selected from the class consisting of piperidine, β- and γ-pipecoline, pyrrolidine, morpholine, and tetrahydroquinoline, X represents an acid radical, Y represents the residue of a 5-membered heterocyclic nitrogenous ring system, and Z represents the atoms necessary to complete a heterocyclic nitrogenous nucleus of the type used in cyanine dyes.

6. The process for the production of a trinuclear cyanine dyestuff characterized by the following formula:

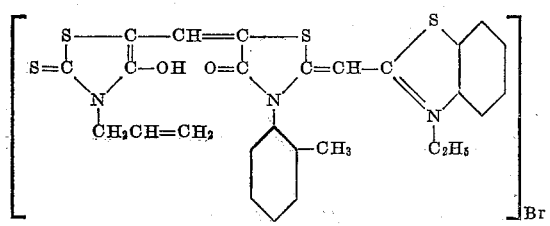

which comprises treating in the presence of a basic condensing agent a thiazolone cyanine dye intermediate of the formula:

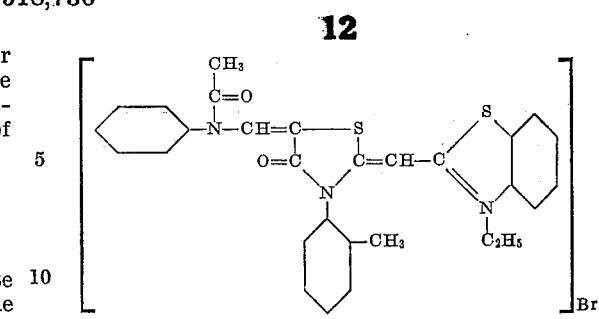

with 3-allylrhodanine.

7. The process for the production of a trinuclear cyanine dyestuff characterized by the following formula:

[structure]

which comprises treating in the presence of a basic condensing agent a thiazolone cyanine dye intermediate of the formula:

[structure]

with 3-allylrhodanine.

8. The process for the production of a trinuclear cyanine dyestuff characterized by the following formula:

[structure]

which comprises treating in the presence of a basic condensing agent a thiazolone cyanine dye intermediate of the formula:

[structure]

with 3-methyl-1-phenylpyrazolone.

THOMAS R. THOMPSON.

No references cited.